Apr. 24, 1923.
W. GANZ
1,453,256
LOCK FOR STEERING GEARS
Filed Dec. 7, 1921
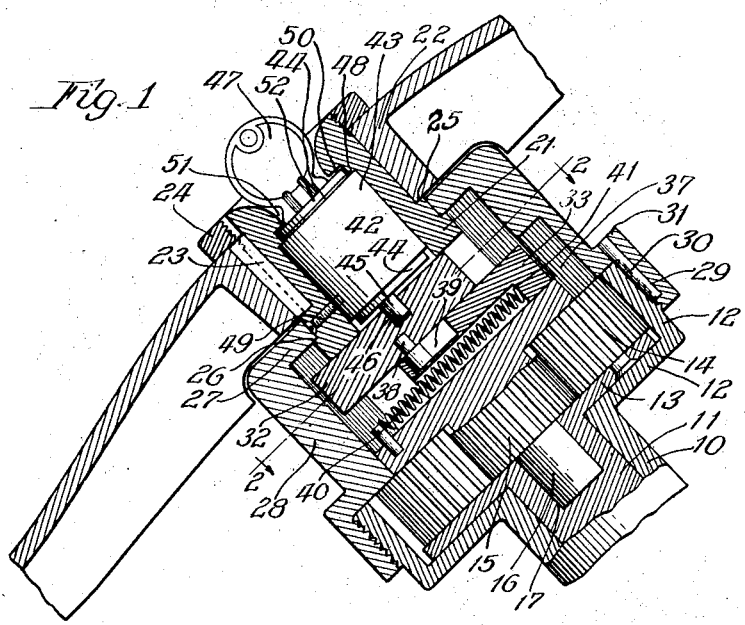
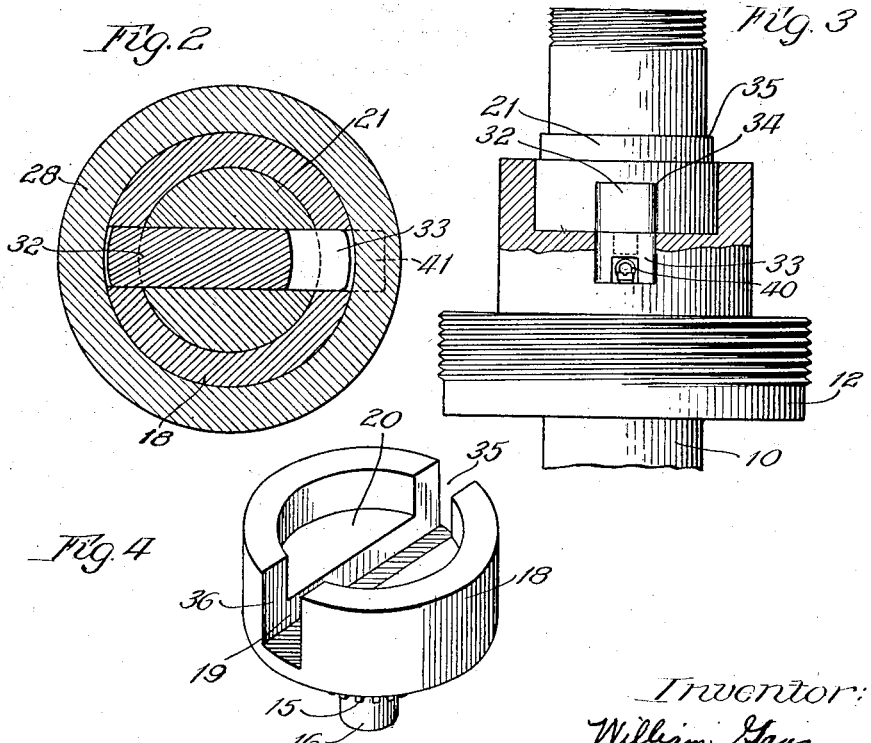
Inventor:
William Ganz
By: Wm. O. Belt
Atty.

Patented Apr. 24, 1923.

1,453,256

UNITED STATES PATENT OFFICE.

WILLIAM GANZ, OF CHICAGO, ILLINOIS.

LOCK FOR STEERING GEARS.

Application filed December 7, 1921. Serial No. 520,468.

*To all whom it may concern:*

Be it known that I, WILLIAM GANZ, a citizen of the United States, residing at Chicago, in the county of Cook and State of Illinois, have invented certain new and useful Improvements in Locks for Steering Gears, of which the following is a specification.

This invention relates to automobiles and has for its principal object to enable the operator to quickly render the steering gear operative or inoperative, and securely lock it in either condition.

More specifically, an object of the invention is to enable the operator to disconnect the steering wheel from the steering shaft and secure the steering shaft against operation by simply moving the key and to release the steering shaft and connect the steering wheel with the steering shaft by another movement of the key.

Another object of the invention is to render it impossible to drill the lock and operate it without a key.

Another object of the invention is to provide a structure in which parts can be made by simple operations, and to a large extent, by automatic machinery.

Further objects will become apparent as the description is read in connection with the accompanying drawing illustrating a selected embodiment of the invention, and in which—

Fig. 1 is a vertical section of this selected embodiment;

Fig. 2 is a transverse section on the line 2—2 of Fig. 1;

Fig. 3 is a side elevation with the outer parts removed to better illustrate the mechanism; and Fig. 4 is a perspective view of a section of the steering shaft.

I have selected an embodiment of the invention which is particularly suited to steering gears which include planetary gearing, but those skilled in the art will be able to make the necessary changes to adapt the invention to other forms of steering gear and the structure here disclosed is intended to be merely illustrative. In this present construction, 10 indicates a steering column in which a steering shaft 11 is mounted to rotate. The upper end of the steering column 11 is equipped with a housing 12 adapted to receive a flange 13 carried by the steering shaft 11 on which are journaled planet gears 14. Meshing with the gears 14 is a sun gear 15 which is usually made integral with an upper shaft section having a pintle 16 journaled in a socket 17 in the upper end of the steering shaft 11, and an upwardly extending portion (not shown) on which the steering wheel is mounted.

In applying my invention to this type of steering gear, I have made the sun gear 15 integral with a cup-shaped shaft section 18 having a transverse slot 19 therein. This cup-shaped shaft section may be made integral with the sun gear 15 and the pintle 16, or may be secured thereto in any suitable manner. The cylindrical seat 20 in the cup-shaped shaft section 18 is adapted to receive the lower end of a third shaft section 21 on which the hub of the steering wheel 22 is secured by a key 23 and a nut 24. This third shaft section 21 has a suitable shoulder 25 to limit the downward movement of the wheel 22 and a second shoulder 26, adapted to be engaged by a flange 27 of a cup-shaped cover 28 screwed onto the housing 12 in place of the usual cap. This cover 28 is provided with a plurality of key-ways 29 extending parallel to the axis of the housing 12 and stopping short of the bottom edge of the cover. After locating the cover in the desired position, I drive hardened steel keys 30 into these key-ways thereby cutting corresponding key-ways in the outer wall of the housing 12. These keys are somewhat shorter than the key-ways 29 and are driven until flush with the surface 31 of the cover. By this construction it becomes practically impossible to remove the cover 28 without completely destroying it. By providing the two shaft sections 18 and 21 arranged as illustrated, it is possible to add simple devices for connecting the sections together for joint rotation, or disconnecting them so as to allow the upper section to rotate freely while the lower section is locked to prevent any steering movement of the shaft 11. I accomplish this by the bolts 32 and 33. The bolt 32 lies in a slot 34 in the shaft section 21 which is surrounded by cylindrical walls of the seat 20 in the shaft section 18. When the ends of the slot 34 are aligned with the slots 35 and 36 in the walls of the seat 20, the bolt 32 may be moved to effectually connect the shaft sections 18 and 21 for joint rotation. The bolt 32 should be of considerable size so as to afford the necessary strength to resist all the stresses to which the steering shaft is subjected in use. The length of this bolt is substantially equal to the diameter of the lower end of the shaft section 21, so that it may be withdrawn within the confines of this shaft section to permit the wheel 22 to be freely rotated without effecting the position of the shaft section 18.

The bolt 33 is mounted in the slot 19 and is adapted to be projected into a recess 37 on the inside of the cover 28, to lock the shaft section 18 against any steering movement. There may be any desired number of recesses 37 so that the steering gear may be locked with the guiding wheels in any one of a plurality of positions, but ordinarily a single recess located so that the wheels can be locked in straight-ahead position will be more suited to present day laws and customs. In many cities locks cannot be lawfully used that will secure the guiding wheels in a position to steer the vehicle to one side or the other. It is desirable to have the bolts 32 and 33 move together in unlocking the steering gear, so that as the bolt 32 connects the sections of the steering shaft together, the bolt 33 will release the section 18. I accomplish this by means of the pin 38 carried by the bolt 32 and projecting into an elongated slot 39 in the bolt 33. The slot 39 should be of sufficient length to permit the bolt 32 to be moved within the confines of the shaft section 21 without any movement of the bolt 33, so that this operation may take place when the shaft is in a position where the slots 35 and 36 are not in alignment with the recess 37. A spring 40 here shown as located in a recess 41 in the lower surface of the bolt 33 is constantly urging the bolt 33 to the right in Fig. 1. Consequently when the bolt 32 has been moved to a position in which the steering wheel 22 is free to rotate independently of the shaft, the bolt 33 may, or may not be in the seat 37, but as soon as the steering shaft is moved either by the guiding wheels or otherwise until the slots 35 and 36 align with the recess 37, the bolt 33 will immediately move into the recess and lock the steering shaft.

The position of the bolt 32 is controlled by a suitable lock 42, here shown as a cylinder lock, but which may be a combination lock, or any other that may be desired. In the form illustrated the lock includes a barrel 43 equipped with a plug 44 having an eccentric 45 seated in a transverse slot 46 in the upper side of the bolt 32. The plug 44 is equipped with suitable plungers and is operated by a key 47 in a well understood manner. It will be obvious that by turning the key 47 the bolt 32 may be moved to connect the shaft sections 21 and 18 for steering operation, or to disconnect the shaft section so as to permit the wheel 22 to rotate freely. It will also be obvious that when the bolt 32 is moved to the position shown in Fig. 1, the bolt 33 is positively withdrawn from the recess 37, and held in that position so that there is no danger of the steering gear becoming locked when the key 47 is in the proper position. The presence of the slot 39 and the spring 40 make it possible to turn the key 47 to move the bolt 32 to the opposite position from that shown in Fig. 1 without regard to the position of the steering wheel. If it happens that the bolt 33 is in position to enter the recess 37 the steering shaft will be immediately locked, but if the bolt 33 is in any other position, the steering wheel can be freed and the steering shaft will become locked if any such movement is given to the steering shaft as will bring the bolt 33 into alignment with the recess 37.

The lock 42 is inserted in the shaft section 21 from the bottom and the barrel 43 has its upper end resting against the shoulder 48; a screw 49 or other device serves to secure the barrel in this position. The shaft section 21 is counter-bored above the shoulder 49 to provide a pocket 50 so as to permit the block 44 to be rotated freely in the barrel without friction against any part of the shaft section. The pocket 50 communicates with the upper end of the shaft section by a flaring opening 51 just large enough to admit the key 47 and its walls are made curving, as illustrated, to prevent the use of a drill or other tools that might be employed in an attempt to operate the lock by means other than the key 47. As a further means of preventing the lock from being drilled or cut, I provide a hardened steel washer 52 which is secured to, and covers the entire upper end of the block 44. This washer is, of course, provided with a key slot corresponding to the slot in the block.

From the foregoing it will be seen that I have provided means by which the steering wheel can be connected with, or disconnected from the steering shaft and the steering shaft can be secured against operation, or released for operation by the mere turning of a key. The means described will permit the steering gear to be rendered operative or inoperative at will, regardless of the position of the guiding wheels, and an attempt to move the vehicle will invariably result in the steering shaft being locked in position to direct the vehicle in a straight line. The presence of the hardened steel washer 52 and the manner of mounting the lock 42 in the shaft section 21 makes it practically impossible for the lock to be operated by any means except the key 47.

I have described the parts 21 and 18 as shaft sections for convenience, but it will be understood that the member 21 is for all operative purposes a part of the steering wheel, and the member 18 may be integral with or rigidly affixed to the shaft 11 when the invention is applied to vehicles in which the steering gear does not include planetary gearing.

Various changes may be made in the form, arrangement and construction of the parts without departing from the spirit and scope of the invention, or sacrificing any of its material advantages, the forms hereinbefore described being merely the preferred embodiments thereof.

I claim:

1. In a steering gear, a steering column, a steering shaft normally rotatable in said column, a steering wheel normally connected with said shaft to rotate therewith, and means for disconnecting said steering wheel from said steering shaft and securing said steering shaft against rotation.

2. In a steering gear, a steering column, a steering shaft therein, a steering wheel, means to connect said wheel with and disconnecting it from said steering shaft, and means to secure said steering shaft against steering movement and to release it for steering movement.

3. In a steering gear, a steering shaft, key-controlled means for securing said shaft against steering movement, said means permitting said key to be moved to locked position regardless of the position of said shaft, and operating automatically after such movement of the key to secure said shaft when it is moved to proper position.

4. In a steering gear, a steering column, a steering shaft therein, a steering wheel, means adapted to simultaneously disconnect said steering wheel from said steering shaft, and secure said steering shaft against steering movement.

5. In a steering gear, a steering column, a steering shaft therein, a steering wheel, means for connecting said steering wheel to said steering shaft, and means for securing said steering shaft against steering movement, said means adapted to operate simultaneously to disconnect the steering wheel from the steering shaft and secure the steering shaft against steering movement.

6. In a steering gear, a steering column, a steering shaft adapted to rotate in said column, a steering wheel, means adapted to simultaneously disconnect said steering wheel from said steering shaft, and secure said steering shaft against rotation, and adapted to simultaneously release said steering shaft and connect said steering wheel to said steering shaft.

7. In a steering gear, a steering column, a steering shaft therein, a steering wheel adapted to operate said steering shaft to guide the vehicle, means for rendering said steering gear operative or inoperative including a plurality of bolts adapted to move simultaneously to disconnect said steering wheel from said steering shaft and secure said steering shaft against rotation.

8. In a steering gear, a steering column, a steering shaft, a steering wheel, a bolt adapted to connect said steering wheel to said steering shaft or to release said steering wheel from said steering shaft, and a bolt adapted to secure said steering shaft against movement or release it for movement.

9. In a steering gear, a steering column, a steering shaft, a steering wheel, a bolt adapted to connect said steering wheel to said steering shaft or to disconnect said steering wheel from said steering shaft, a bolt adapted to secure said steering shaft against movement or to release it for movement, and means for operating said bolts simultaneously.

10. In a steering gear, a steering column, a steering shaft, a steering wheel, a movable bolt adapted to connect said steering shaft with said steering wheel or disconnect it therefrom, a bolt adapted to connect said steering shaft with said steering column or disconnect it therefrom, and means for operating said bolts simultaneously to connect said steering shaft with said steering wheel and to release said steering shaft from said steering column, said means being adapted to operate the first mentioned bolt to connect the steering shaft to the steering wheel independently of the last mentioned bolt.

11. In a steering gear, a steering column, a steering shaft, a steering wheel, means to connect said steering wheel with and disconnect it from said steering shaft, and means to automatically secure said steering shaft against movement when said steering wheel is disconnected from said steering shaft.

12. In a steering gear, a steering column, a steering shaft, a steering wheel, means for connecting said steering wheel with and disconnecting it from said steering shaft, and means for automatically securing said steering shaft against movement when said steering wheel is disconnected from said steering shaft, said last mentioned means being automatically operated to release said steering shaft when said steering wheel is connected with said steering shaft.

13. In a steering gear, a steering shaft, key controlled means for securing said shaft against steering movement including a bolt, a lock, an operative connection between the bolt and the lock permitting the lock to be operated independently of the bolt, and means for automatically moving the bolt to lock the shaft when the latter is moved to proper position.

14. In a steering gear, a steering column, a steering shaft therein, a steering wheel, means adapted to simultaneously disconnect said steering wheel from said steering shaft and secure said steering shaft against steering movement including a lock substantially co-axial with the steering wheel and accessible from the upper side thereof.

15. In a steering gear, a steering column, a steering shaft therein, a steering wheel, means to simultaneously disconnect said steering wheel from said steering shaft and secure said steering shaft against steering movement including a plurality of radially movable bolts, and a lock for operating said bolts mounted substantially co-axial with the steering wheel and accessible from the upper side.

16. In a steering gear, a steering column, a steering shaft rotatably mounted in said column, a steering wheel adapted to rotate said shaft, means rotating with the wheel and movable radially to the axis of said shaft for rendering said steering gear inoperative or operative, and a lock for controlling said means mounted co-axial with said steering shaft and accessible from the upper side of said wheel.

17. In a steering gear, a steering column, a steering shaft rotatable therein, a steering wheel adapted to rotate said steering shaft, means rotating with the wheel and movable radially to the axis of said steering shaft for connecting said wheel with and disconnecting it from said shaft, and a lock for operating said means mounted substantially at the center of said wheel and accessible from the upper side thereof.

18. In a steering gear, a steering column, a steering shaft rotatable therein, a steering wheel adapted to rotate said steering shaft, means moving radially to the axis of said steering shaft for connecting said steering wheel to said steering shaft and disconnecting it therefrom, means moving radially to the axis of said steering shaft for locking said steering shaft against rotation, and a lock for operating said radially moving means mounted co-axial with said shaft and accessible from the upper side of said steering wheel.

19. In a steering gear, a supporting column having a gear housing at its upper end, a steering shaft rotatable in said steering column, an upper shaft section, gearing between said steering shaft and said upper shaft section, a steering wheel adapted to be operatively connected with said upper shaft section, a cover for said housing, a bolt carried by said upper shaft section adapted for locking engagement with said cover and a lock co-axial with said wheel for operating said bolt.

20. In a steering gear, a steering column having a gear housing at its upper end, gearing in said housing, a steering shaft section connected with said gearing, a cover secured to said housing and surrounding said steering shaft section, and a bolt carried by said section adapted to engage said cover to lock said shaft section thereto.

WILLIAM GANZ.